United States Patent [19]

Persyk

[11] Patent Number: 5,059,798

[45] Date of Patent: Oct. 22, 1991

[54] FRANGIBLE BONDING OF PHOTOMULTIPLIER TUBES FOR USE IN SCINTILLATION CAMERAS AND PET SCANNERS

[75] Inventor: Dennis E. Persyk, Barrington, Ill.

[73] Assignee: Siemens Gammasonics, Inc., Hoffman Estates, Ill.

[21] Appl. No.: 703,553

[22] Filed: May 21, 1991

[51] Int. Cl.⁵ .......................... G01T 1/20; G01T 1/164
[52] U.S. Cl. ............................... 250/363.03; 250/368; 250/367; 250/363.02
[58] Field of Search ........... 250/368, 366, 367, 363.03, 250/363.01, 363.02, 207, 213 VT

[56] References Cited

U.S. PATENT DOCUMENTS

| | | | |
|---|---|---|---|
| 4,029,964 | 6/1977 | Ashe | 250/368 |
| 4,292,538 | 9/1981 | Carlson | 250/367 |
| 4,731,534 | 3/1988 | Klein et al. | 250/367 |
| 4,795,910 | 1/1989 | Henderson et al. | 250/368 |
| 5,012,103 | 4/1991 | Tanaka et al. | 250/368 |

Primary Examiner—Carolyn E. Fields
Assistant Examiner—Drew A. Dunn
Attorney, Agent, or Firm—Mark H. Jay

[57] ABSTRACT

Photomultiplier tubes are bonded using silicone gel, which cures to a soft state. Small glass or plastic spheres are placed in the gel before it has cured so as to weaken it and make it easier to shear when the photomultiplier tubes are twisted or tipped. The resulting bond is mechanically and optically adequate but not so strong as to make it impossible to remove a photomultiplier tube which must be replaced.

11 Claims, 2 Drawing Sheets

FRANGIBLE BONDING OF PHOTOMULTIPLIER TUBES FOR USE IN SCINTILLATION CAMERAS AND PET SCANNERS

BACKGROUND OF THE INVENTION

The invention relates to scintillation cameras and positron emission tomography (PET) scanners such as are used in nuclear medicine to produce images of a portion of a patient's body. The invention more particularly relates to the detector structure of such cameras and scanners. In its most immediate sense, the invention relates to the manner in which the photomultiplier tubes are mechanically and optically secured in the detector.

In the past, photomultiplier tubes ("PMTs") have been coupled to the light pipe or to the scintillator using grease. While this produces a coupling which is satisfactory from the standpoint of optical coupling characteristics, it is mechanically unsatisfactory and mechanical means such as spring loading were required to make sure that the PMTs were properly maintained in proper position with the light pipe.

To improve on this coupling technique, Siemens Gammasonics, Inc. has used room temperature vulcanizing ("RTV") adhesive between the primed light pipe and the PMTs. While this has been an improvement over the use of grease, it has caused another problem to come about.

This problem is that it is at least difficult, and sometimes impossible, to remove a single PMT from the light pipe. Where this can be done in the field, special tools are necessary; where this is impossible in the field, this operation must be carried out in the factory. The task is difficult because the PMTs are packed densely and the RTV bonds quite strongly (more than 100 psi in shear) to the PMT and lightpipe.

PMTs fail and must be replaced. It would therefore be advantageous to make it easier to remove a PMT without adversely affecting the optical and mechanical connection which is achieved using RTV adhesives.

One object of the invention is to provide a technique whereby PMTs may, in scintillation cameras and PET scanners, be bonded with adequate optical and mechanical characteristics while still being removable with reasonable effort and without damaging the PMT or the component to which it is attached.

Another object is, in general, to improve generally on existing PMT bonding techniques.

In accordance with the invention, the bonding adhesive used cures to a soft state. Furthermore, at least one stress-increasing body is introduced into the bonding adhesive before the PMT is glued down.

The adhesive is sufficiently strong and sufficiently transparent to ultraviolet radiation so that the mechanical and optical characteristics of the bond are entirely adequate. However, the stress-increasing bodies weaken the bond so that it is quite weak (decoupling only requires a torque of, e.g. 25 inch-pounds) in torsional load. It is therefore easy to decouple the PMT. Where the PMT is round, this may be done by grasping it and twisting it; after a minute or so of twisting, the PMT comes off without breaking. Where the PMT is square or hexagonal, the PMT may be tipped a few degrees and held in the tipped position for a few minutes. In both instances, the PMTs begin to decouple at a stress-increasing body and the decoupled interface spreads until the tube may easily be lifted off. A new PMT may then be installed in the space with a small quantity of fresh adhesive.

Advantageously, the adhesive is a silicone dielectric gel and the bodies are glass or plastic spheres which may be as small as 0.25 mm or as large as 3 mm in diameter, but which are advantageously 1 mm or 0.5 mm in diameter. Such beads are inexpensive, do not interfere with the curing of the gel, and have a highly constant diameter. Alternatively, the adhesive may be an RTV adhesive weakened with a diluent such as dimethylsiloxane, or may be a single-component adhesive. Where the PMT is bonded to an acrylic plastic light pipe, the light pipe is advantageously primed before the adhesive is applied.

BRIEF DESCRIPTION OF THE DRAWINGS

The invention will be better understood with reference to the following illustrative and non-limiting drawings, in which.

DETAILED DESCRIPTION OF PREFERRED EMBODIMENTS

It will be understood that each scintillation camera or PET scanner contains a multiplicity of PMTs. In a scintillation camera, the PMTs may be bonded to a single light pipe or to a thickened crystal window; in the case of a PET scanner, there are a plurality of detectors and within each detector, the PMTs are bonded directly to the scintillator material. (In a conventional PET scanner, the scintillator is BGO which, because it is non-hygroscopic, need not be encapsulated as are the scintillators usually used in scintillation cameras.) For the sake of clarity, only a few PMTs and only one scintillator are shown in the Figures. Likewise, dimensions are exaggerated for the sake of clarity and the Figures are not to scale.

All scintillation cameras utilize PMTs to view scintillation events which occur in a scintillation crystal 100. In some cases, such as PET scanners wherein the scintillator is BGO, the PMTs are bonded directly to the scintillator. In other cases, the PMTs are bonded to light pipes or to a thickened crystal window. The description below relates specifically to bonding with a light pipe made of PLEXIGLAS brand acrylic plastic since gamma cameras made by Siemens Gammasonics, Inc. incorporate this structure, but the invention applies equally well where the PMTs are bonded either to a thickened crystal window or directly to a scintillator such as BGO.

Figure 1:
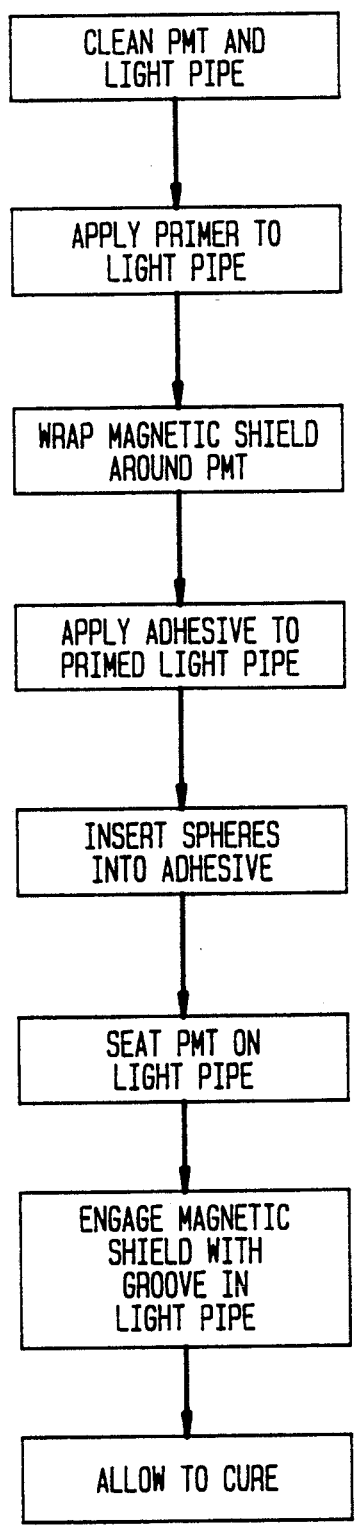
FIG. 1 illustrates a preferred embodiment of the invention.
Figure 2:
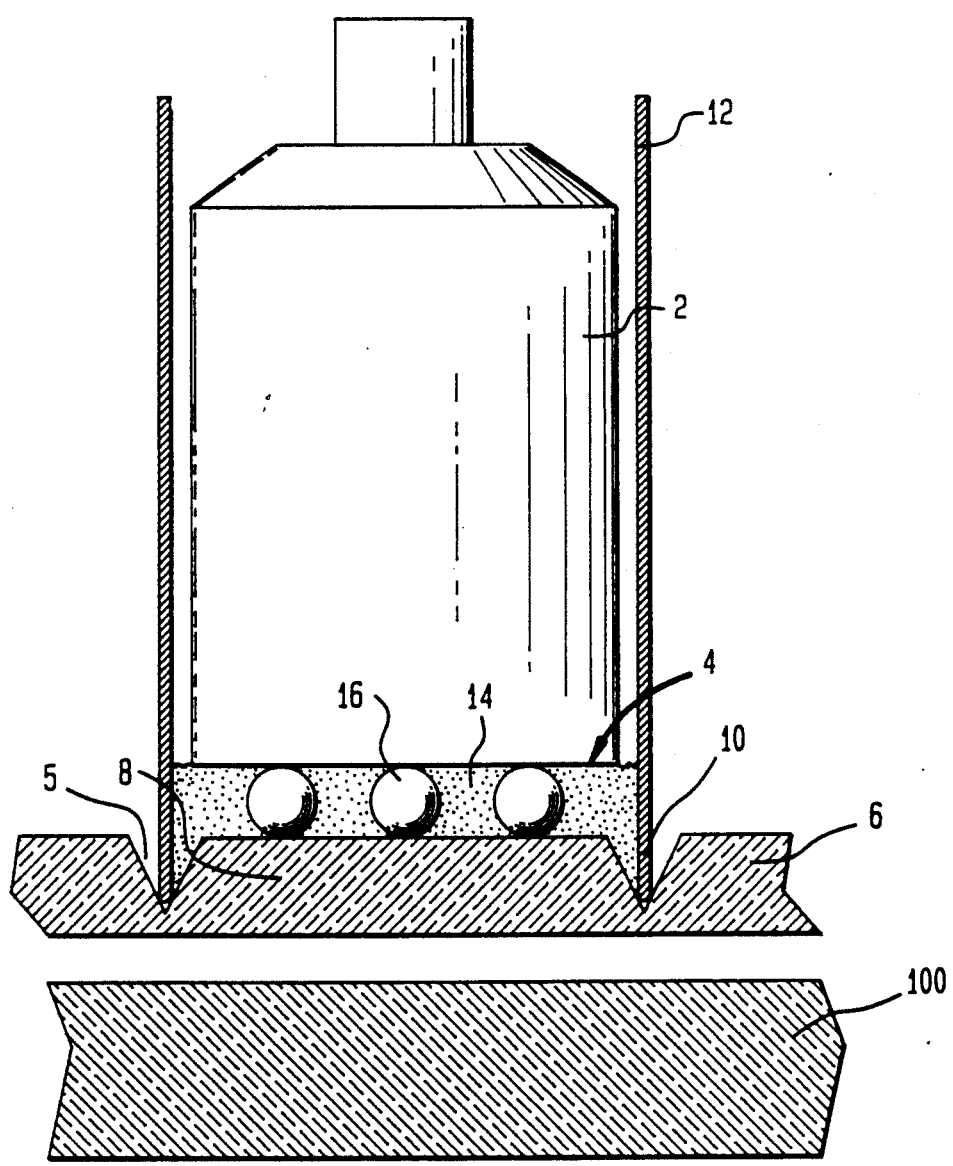
FIG. 2 shows the structure produced using the FIG. 1 preferred embodiment.

Referring to FIG. 2, conventional PMTs 2 have glass faceplates 4 and conventional light pipes 6 are made of acrylic plastic. Initially, the faceplates 4 of the PMTs 2 and the pads 8 of the light pipe 6 are cleaned with methanol and the lower ends 10 of each of the tube shields 12 are likewise cleaned. The tube shields 12 are then wrapped around the PMT's 2 with the lower ends 10 above the faceplates 4 and taped in position. Since acrylic plastic contains plasticizers and other chemicals which cause its surface to bond poorly with adhesives, the pads 8 are primed using an adhesion promotor, which advantageously is Dow Corning X3-6340. After the primer has cured, the silicone gel adhesive (advantageously Dow Corning Q3-6636) is mixed as described below and de-aired in a vacuum chamber for about two minutes to remove air bubbles. Then, a bead of approximately 4 cc of the mixed adhesive 14 is applied to each of the pads 8.

Into each of the beads of adhesive 14 is inserted, using tweezers, at least one and advantageously three spheres 16 of glass or plastic. Each sphere 16 is approximately 1 mm in diameter, although it may be smaller or larger.

After the spheres 16 have been inserted, advantageously in a triangular configuration, the PMTs 2 are placed on top of the beads of adhesive 14. The PMT 2 is tipped onto the adhesive 14 to squeeze out the air and the PMT 2 is rocked until it is seated on the pad 8. Then, each tube shield 12 is pressed downwardly to urge the PMT 2 into the bead of adhesive 14.

While the PMT 2 is seated on the pad 8, the tube shield 12 is further pressed downwardly until the lower end 10 engages the circular groove 5 which surrounds the pad 8 in the lightpipe 6. Because the lower end 10 is circular and the groove 5 is circular, the interaction of the tube shield 12 and the groove 5 centers the PMT 2 on the pad 8. Advantageously, the PMT 2 is rotated a few degrees to couple it to the pad 8 and the shield is rotated about 30 degrees to help seat it firmly into the groove 5.

After the PMT 2 has been so coupled to the light pipe 4, it is advantageously weighted in position and allowed to cure. This weighting step may be omitted during a repair in the field.

The adhesive 14 in the preferred embodiment is a two part elastomer. It transmits ultraviolet radiation well, and it is possible to vary its physical properties by varying the ratio in which the parts are mixed. As presently practiced, the mixture used is a function of the size of the PMTs 2 which are to be bonded. For 2" PMTs, a mixture of 40% part A and 60% part B is presently preferred, while for 3" PMTs, which should be bonded with a weaker bond because there is more surface available for bonding, a mixture of 60% part A and 40% part B is preferred.

While the adhesive can be mixed in ratios of A:B between 30:70 and 70:30, the ratio is advantageously fixed between 40:60 and 60:40 so that a Liquid Controls dispensing machine, which mixes the parts in a swirl nozzle, can be utilized. This machine has a dynamic mixing range which is limited to approximately the range of 40:60 to 60:40. Where this machine is used, de-airing in a vacuum chamber as described above is accomplished by operation of the machine and therefore need not be carried out as a separate step.

Once a PMT has been bonded and must be replaced, force is applied to it so as to maintain it in a slightly displaced position for a short time. (Where the PMT is round, the top of the PMT is grasped and twisted; where the PMT is square or hexagonal, the top of the PMT is tipped.) The spheres 16 in the adhesive 14 serve to weaken the bond of the adhesive 14 and thereby provide locations where the adhesive is most likely to start to tear. The shear torque, about 25 inch-pounds, can be varied both by varying the mixture of parts A and B of the adhesive and by varying the size and number of the spheres.

Although a preferred embodiment has been described above, the scope of the invention is limited only by the following claims:

1. A method of detachably securing photomultiplier tubes to an element in a detector, comprising the following steps:
   applying, to the element and at locations where photomultiplier tubes are to be attached, a measured quantity of an adhesive which cures to a soft state;
   introducing, into each of the measured quantities, at least one stress-increasing body; and
   placing, onto each of the measured quantities with said at least one stress-increasing body therein, a photomultiplier tube.

2. The method of claim 1, further comprising the step of applying a primer to the element before applying said measured quantities of adhesive.

3. The method of claim 1, wherein the adhesive is a silicone dielectric gel.

4. The method of claim 1, wherein each stress-increasing body is a sphere of glass or plastic.

5. The method of claim 1, wherein the element is a scintillator.

6. The method of claim 2, wherein the element is a light pipe and the primer is an adhesion promoter.

7. The method of claim 4, wherein all the spheres have a common diameter.

8. The method of claim 7, wherein said diameter is at least 0.25 mm and at most 3 mm.

9. The method of claim 8, wherein said diameter is 1 mm.

10. A scintillation camera with a detector in which individual photomultiplier tubes are easily detachable from the light pipe to which they are secured, comprising:
    a scintillation crystal;
    a light pipe secured to the scintillation crystal;
    a plurality of photomultiplier tubes mounted in operative relation to the light pipe;
    silicone dielectric gel adhesively securing each of said plurality of photomultiplier tubes to the light pipe; and
    stress-increasing bodies disposed in said gel.

11. A PET scanner with a detector in which individual photomultiplier tubes are easily detachable from the scintillator to which they are secured, comprising:
    at least two scintillators;
    at least one photomultiplier tube mounted in operative relation to each of said at least two scintillators;
    silicone dielectric gel adhesively securing each of said photomultiplier tubes to a corresponding one of said at least two scintillators; and
    stress-increasing bodies disposed in said gel.

* * * * *